United States Patent
Lee

(10) Patent No.: US 9,142,815 B2
(45) Date of Patent: Sep. 22, 2015

(54) METHOD FOR MANUFACTURING A POROUS NANOWEB

(75) Inventor: Moo-Seok Lee, Seoul (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 13/703,142

(22) PCT Filed: Jun. 21, 2011

(86) PCT No.: PCT/KR2011/004510
§ 371 (c)(1),
(2), (4) Date: Dec. 10, 2012

(87) PCT Pub. No.: WO2011/162528
PCT Pub. Date: Dec. 29, 2011

(65) Prior Publication Data
US 2013/0078527 A1    Mar. 28, 2013

(30) Foreign Application Priority Data

Jun. 21, 2010    (KR) .................. 10-2010-0058575

(51) Int. Cl.
| | | |
|---|---|---|
| B29C 70/16 | (2006.01) |
| B29C 70/28 | (2006.01) |
| H01M 2/16 | (2006.01) |
| D01D 5/00 | (2006.01) |
| D04H 1/728 | (2012.01) |
| D04H 3/016 | (2012.01) |
| D04H 3/02 | (2006.01) |
| H01M 2/14 | (2006.01) |
| H01M 2/34 | (2006.01) |

(52) U.S. Cl.
CPC .............. *H01M 2/162* (2013.01); *D01D 5/003* (2013.01); *D01D 5/0038* (2013.01); *D01D 5/0046* (2013.01); *D01D 5/0084* (2013.01); *D04H 1/728* (2013.01); *D04H 3/016* (2013.01); *D04H 3/02* (2013.01); *H01M 2/145* (2013.01); *H01M 2/348* (2013.01); *H01M 2/1686* (2013.01)

(58) Field of Classification Search
CPC ... D01D 5/003; D01D 5/0038; D01D 5/0046; D01D 5/0084; D04H 1/728
USPC ................. 264/10, 171.1, 464, 465, 466, 484
See application file for complete search history.

(56) References Cited

U.S. PATENT DOCUMENTS

| | | |
|---|---|---|
| 2002/0045091 A1 | 4/2002 | Kamei et al. |
| 2003/0137069 A1 | 7/2003 | Reneker |
| 2008/0110342 A1* | 5/2008 | Ensor et al. ............... 264/484 X |
| 2009/0169725 A1* | 7/2009 | Zhamu et al. ................... 427/77 |
| 2009/0258300 A1* | 10/2009 | Moriyama et al. ............ 429/249 |
| 2010/0003588 A1 | 1/2010 | Sudou et al. |
| 2010/0197027 A1* | 8/2010 | Zhang et al. ............... 264/484 X |
| 2010/0297443 A1 | 11/2010 | Kamisasa et al. |
| 2011/0081601 A1 | 4/2011 | Weber et al. |
| 2011/0130063 A1* | 6/2011 | Matsubayashi et al. ...................... 264/210.2 X |
| 2011/0177395 A1 | 7/2011 | Kamisasa |
| 2011/0236744 A1* | 9/2011 | Kim et al. ................. 264/466 X |
| 2011/0287082 A1* | 11/2011 | Smith et al. ................... 424/444 |
| 2012/0164514 A1 | 6/2012 | Hayakawa et al. |

FOREIGN PATENT DOCUMENTS

| | | |
|---|---|---|
| JP | 2002-170540 A | 6/2002 |
| JP | 2003-306863 A | 10/2003 |
| JP | 2009-095828 A | 5/2009 |
| JP | 2009-150039 A | 7/2009 |
| JP | 2010-103050 A | 5/2010 |
| KR | 10-0824437 B1 | 4/2008 |
| WO | 2008/018584 A1 | 2/2008 |
| WO | WO-2008099140 A2 * | 8/2008 |
| WO | 2009/103537 A1 | 8/2009 |
| WO | 2010/027063 A1 | 3/2010 |
| WO | 2011/033975 A1 | 3/2011 |

OTHER PUBLICATIONS

Korean Intellectual Property Office, Communication dated Jan. 28, 2014 issued in corresponding Korean Application No. 10-2011-0059990.
State Intellectual Property Office of The P.R.C. , Communication dated Jan. 29, 2015 issued in counterpart Chinese application No. 201180030277.3.

* cited by examiner

*Primary Examiner* — Leo B Tentoni
(74) *Attorney, Agent, or Firm* — Sughrue Mion, PLLC

(57) ABSTRACT

Disclosed is a porous nanoweb including first and second nanofilaments, which facilitates to perform heat resistance simultaneously with a shutdown function for preventing a battery explosion caused by an abnormal heat generation, and to realize small thickness and easy control of porosity, wherein, if the porous nanoweb is used as a battery separator for a secondary battery, it allow the good battery efficiency and good safety owing to the low resistance, the porous nanoweb comprising the first nanofilament having a melting temperature not more than 200° C.; and the second nanofilament having a melting temperature not less than 210° C.

5 Claims, No Drawings

METHOD FOR MANUFACTURING A POROUS NANOWEB

CROSS REFERENCE TO RELATED APPLICATIONS

This application is a National Stage of International Application No. PCT/KR2011/004510 filed Jun. 21, 2011, claiming priority based on Korean Patent Application No. 10-2010-0058575 filed Jun. 21, 2010, the contents of all of which are incorporated herein by reference in their entirety.

TECHNICAL FIELD

The present invention relates to a porous nanoweb and a method for manufacturing the same, and more particularly, to a porous nanoweb capable of being used for manufacturing a battery separator of a secondary battery, and a method for manufacturing the same.

BACKGROUND ART

With the rapid advance of the electrical, electronics, and computer industries, there is the gradual increase in demand for a secondary battery with high performance and high safety. Especially, an electric automobile is actively researched and studied in response to the increased interest for the environments. The secondary battery is one of the most important elements of the electric automobile.

The secondary battery includes an anode, a battery separator, and a cathode. For improving efficiency of the secondary battery, it is necessary to obtain the thin battery separator and to secure high porosity and good thermal stability for the battery separator.

For the good thermal stability, the battery separator has to perform a shutdown function, and have a high short-circuit temperature. At this time, the shutdown function is to prevent an additional heat generation through a current cutoff by closing up minute pores of the battery separator if a temperature inside the secondary battery is higher than a predetermined value. The short-circuit temperature means a temperature at which the battery is short-circuited by the battery separator being shrunk, decomposed, and broken. If the battery separator has good heat resistance, the short-circuit temperature is raised.

A typical example of the related art battery separator is a battery separator prepared by polyolefin such as polyethylene or polypropylene. The polyolefin battery separator having a low melting temperature is advantageous in that the shutdown function is properly performed even in case of the battery whose temperature is abnormally high. However, since the short-circuit temperature is too low, it is difficult to apply the polyolefin battery separator to the secondary battery for the automobile.

In order to prevent the battery from being short-circuited at a high temperature, there has been proposed a battery separator prepared by polyethylene terephthalate. The battery separator of polyethylene terephthalate has a short-circuit temperature which is higher than the short-circuit temperature of the polyolefin battery separator, to thereby lower a possibility of short-circuit in the battery by the broken battery separator. Meanwhile, on the assumption that the battery separator of polyethylene terephthalate having too high melting point is applied to the battery, if the battery is exposed to the abnormal surroundings of high temperature, the shutdown function is not performed. Typically, since the battery separator of polyethylene terephthalate is manufactured by a non-woven manufacturing process, it is difficult to obtain required thinness and porosity level.

DISCLOSURE

Technical Problem

Therefore, the present invention is directed to a porous nanoweb and a method for manufacturing the same that substantially obviates one or more of the problems due to limitations and disadvantages of the related art.

An aspect of the present invention is to provide a porous nanoweb which facilitates to obtain thinness and good thermal stability, and a method for manufacturing the same.

Technical Solution

To achieve these objects and other advantages and in accordance with the purpose of the invention, as embodied and broadly described herein, there is provided a porous nanoweb comprising: a first polymer having a melting temperature not more than 200° C.; and a second polymer having a melting temperature not less than 210° C.

In another aspect of the present invention, there is provided a method for manufacturing a porous nanoweb, the method comprising: preparing a first spinning solution with a first polymer to manufacture a first nanofilament having a melting temperature not more than 200° C.; preparing a second spinning solution with a second polymer to manufacture a second nanofilament having a melting temperature not less than 210° C.; and electrospinning the first and second spinning solutions.

Advantageous Effects

According to the present invention, the porous nanoweb is prepared by collecting nanofilaments, which facilitates to obtain thinness and high porosity, and to control the pore diameter. Thus, the secondary battery using the above porous nanoweb has the good battery efficiency.

Also, the porous nanoweb of the present invention includes the nanofilament having a low melting temperature. Thus, even though the temperature of battery is abnormally high, the shutdown function is properly performed, to thereby prevent a battery explosion.

Also, the porous nanoweb of the present invention has good thermal stability owing to the nanofilament having good heat resistance and high melting temperature included therein. That is, the porous nanoweb of the present invention has good dimensional stability and durability, thereby preventing the short circuit from occurring in the battery by the broken battery separator.

BEST MODE

Reference will now be made in detail to the exemplary embodiments of the present invention.

Hereinafter, a porous nanoweb according to the present invention and a method for manufacturing the same will be described in detail.

A porous nanoweb according to the present invention includes a first polymer having a melting temperature not more than 200° C., and a second polymer having a melting temperature not less than 210° C.

The first polymer may be polyurethane, polyethylene, polypropylene, copolymer thereof, or mixture thereof; and the second polymer may be polyimide.

A content of the second polymer in the porous nanoweb is 50~90% by weight.

According to one embodiment of the present invention, the first and second polymers may exist in nanofilament types. That is, the porous nanoweb according to one embodiment of the present invention includes a first nanofilament formed of the first polymer, and a second nanofilament formed of the second polymer.

If a battery is abnormally exposed to a high temperature, the first nanofilament promptly performs a shutdown function. That is, if the battery is exposed to the high temperature, the first nanofilament expands or melts so that a pore of a battery separator is blocked, thereby cutting off a current flow and lowering a possibility of battery explosion.

For properly performing the shutdown function at the abnormally high temperature, it is preferable that the first nanofilament have a melting point not more than 200° C., and more preferably, a melting point of 100~200° C.

If the melting point of the first nanofilament is less than 100° C., the shutdown starts at a very low temperature, whereby the frequent cutoff of the current flow may deteriorate the battery efficiency. Meanwhile, if the melting point of the first nanofilament is more than 200° C., the shutdown is not properly performed so that the battery might be exploded.

The first polymer for forming the first nanofilament may be polyurethane, polyethylene, polypropylene, copolymer thereof, or mixture thereof.

The second nanofilament has good heat resistance, and prevents the battery separator from being shrunk and broken when the battery separator is exposed to the surroundings of high temperature and pressure.

In case of a related art polyolefin battery separator such as polyethylene and polypropylene, it has the relatively-low heat resistance. In this case, if the battery is exposed to the high temperature, the related art polyolefin battery separator may be easily shrunk and broken, whereby the battery may be short-circuited and exploded.

There has been proposed a battery separator obtained by coating a polyolefin porous nanoweb with an inorganic material to compensate for the relatively-low heat resistance of the polyolefin battery separator. However, the inorganic material blocks the pores of porous nanoweb, thereby resulting in the deteriorated battery efficiency, the complicated manufacturing process, and the low economical efficiency.

As the second nanofilament is formed of the second polymer having a melting point not less than 210° C., it is possible to provide the second nanofilament having good heat resistance, and to prevent the battery separator from being shrunk and broken by the rapid temperature rise.

Preferably, the second nanofilament has a melting point of 210~600° C. If the melting point of the second nanofilament is less than 210° C., it is too close to the melting point of the first nanofilament so that it is impossible to secure the thermal stability of the battery. Meanwhile, if the melting point of the second nanofilament is more than 600° C., the economical efficiency may be deteriorated due to the complicated manufacturing process of the porous nanoweb.

A content of the second nanofilament in the porous nanoweb is 50~90% by weight. If the content of the second nanofilament is less than 50% by weight, it is difficult to secure the heat resistance of the porous nanoweb. Meanwhile, if the content of the second nanofilament is more than 90% by weight, it is difficult to properly perform the shutdown function due to the lack of first nanofilament.

The first and second nanofilaments may constitute a single nanoweb.

Optionally, the porous nanoweb may include a first sub-nanoweb comprising the first nanofilament, and a second sub-nanoweb comprising the second nanofilament. In this case, the first and second sub-nanowebs are combined by the use of means such as needle punching, to thereby form the porous nanoweb.

According to another embodiment of the present invention, the porous nanoweb may include a composite nanofilament, wherein the composite nanofilament includes a core formed of the second polymer, and a sheath surrounding the core, the sheath being formed of the first polymer.

Selectively, the composite nanofilament may include the first and second polymers arranged side-by-side.

The porous nanoweb according to the present invention includes the plurality of inconsecutive pores which are irregularly arranged in a three-dimensional network structure. Owing to the plurality of pores, the porous nanoweb of the present invention has good wetting property, thereby resulting in the improved battery efficiency.

A pore diameter of the porous nanoweb may be 0.05~30 μm. If the pore diameter is less than 0.05 μm, the battery efficiency may be rapidly deteriorated. Meanwhile, if the pore diameter is more than 30 μm, the mechanical strength of the battery separator may be lowered.

A porosity showing the extent of forming the pores in the porous nanoweb is 40~90%. If the porosity of the porous nanoweb is less than 40%, the battery efficiency may be deteriorated. Meanwhile, if the porosity of the porous nanoweb is more than 90%, the mechanical strength and form stability of the battery separator may be deteriorated.

The porous nanoweb may have a thickness of 1~30 μm. If the thickness of the porous nanoweb is less than 1 μm, the mechanical strength and form stability of the battery separator may be deteriorated. Meanwhile, if the thickness of the porous nanoweb is more than 30 μm, the battery efficiency may be deteriorated due to the resistance loss of the battery separator.

In order to satisfy the above porosity and thickness, the nanofilaments constituting the porous web have an average diameter of 0.005~5 μm, preferably. If the average diameter of the nanofilaments is less than 0.005 μm, the mechanical strength of the porous nanoweb may be deteriorated. Meanwhile, if the average diameter of the nanofilaments is more than 5 μm, it might be difficult to control the porosity and thickness of the porous nanoweb.

A method for manufacturing the porous nanoweb according to one embodiment of the present invention will be described as follows.

The method for manufacturing the porous nanoweb according to the present invention includes steps of preparing a first spinning solution with the first polymer to manufacture the first nanofilament having the melting temperature not more than 200° C.; preparing a second spinning solution with the second polymer to manufacture the second nanofilament having the melting temperature not less than 210° C.; and electrospinning the first and second spinning solutions.

The first and second spinning solutions may be manufactured by respectively dissolving the first and second polymers in an organic solvent such as DMF.

The first polymer for the first spinning solution may be polyurethane, polyethylene, polypropylene, copolymer thereof, or mixture thereof.

The second polymer for the second spinning solution may be thermoplastic polyimide or polyimide precursor.

If the second polymer is the polyimide precursor such as polyamic acid (PAA), the second nanofilament becomes polyimide by imidizing the polyimide precursor after the second spinning solution is electrospinned. The above imidizing process may be chemical imidization and/or heat imidization. For the chemical imidization, a dehydrating agent such as acetic anhydride, and a small amount of imidization catalyst such as tertiary amine may be added to the second spinning solution. For the heat imidization, a heat treatment using a hot press may be carried out.

The above electrospinning process includes applying a voltage to form electric charges in the spinning solution, manufacturing the nanofilament by extruding the spinning solution with the electric charges via a spinning nozzle, and collecting the nonafilament in a collector having electric charges whose polarity is opposite to that of the spinning solution.

The electrospinning process is advantageous in that it facilitates to manufacture the filaments with the nano-sized diameter. The porous nanoweb including the nanofilaments manufactured by the electrospinning process has the small thickness and high porosity. Thus, if the porous nanoweb of the present invention is used for the secondary battery, the battery efficiency is considerably improved owing to the low electric resistance of the porous nanoweb.

According to one embodiment of the present invention, the first sub-nanoweb is formed by electrospinning the first spinning solution, and the second sub-nanoweb is formed by electrospinning the second spinning solution. Then, the first and second sub-nanowebs are combined by the needle punching method, to thereby manufacture the porous nanoweb. Selectively, the second sub-nanoweb may be firstly manufactured, and then the first sub-nanoweb may be manufactured thereon.

According to another embodiment of the present invention, the first and second spinning solutions are simultaneously electrospinnied, thereby forming a single nanoweb. That is, the first and second spinning solutions are respectively supplied to spinneret nozzles to which the voltage is applied, and then are extruded via the spinneret nozzles, to thereby form the first and second nanofilaments at the same time. Then, the first and second nanofilaments are collected in a collector, thereby manufacturing the porous nanoweb.

The manufactured porous nanoweb according to the present invention properly performs the shutdown function owing to the first nanofilament included therein, the first nanofilament having the melting point not more than 200° C.; and prevents the battery from being exploded by the short circuit owing to the second nanofilament included therein.

Also, the porous nanoweb of the present invention has the small thickness, high porosity, and optimal pore size, thereby manufacturing the high-performance secondary battery satisfying the conditions of high thermal stability.

Hereinafter, various embodiments and comparative examples of the present invention will be described to help a clear understanding of the present invention, which are not intended to limit the scope of the present invention.

Embodiment 1

A first spinning solution was manufactured by dissolving polyurethane (Dow Chemical Co.) in a mixture solution of dimethylacetamide/aceton. A second spinning solution was manufactured by dissolving thermoplastic polyimide (Ciba-Geigy Co.) in N-methyl-2-pyrrolidone. Then, the first and second spinning solutions were respectively supplied to multi spinneret nozzles and extruded via the spinneret nozzles simultaneously to form a porous nanoweb. The electrospinning process was carried out under the voltage of 30 kV.

Embodiment 2

A porous nanoweb was manufactured in the same method as described in the above embodiment 1 except that a first spinning solution was manufactured by dissolving polyethylene, instead of the above polyurethane, in toluene.

Embodiment 3

A porous nanoweb was manufactured in the same method as described in the above embodiment 1 except that a polyamic acid porous nanoweb was manufactured by using polyamic acid, a precursor of polyimide, instead of the above thermoplastic polyimide; the polyamic acid porous nanoweb was heat-treated in a hot press maintained at a high temperature and pressure to form a sub-nanoweb; and then the first spinning solution was electrospinned on the sub-nanoweb to form a porous nanoweb.

Embodiment 4

A porous nanoweb was manufactured in the same method as described in the above embodiment 1 except that it was manufactured by respectively electrospinning the first and second spinning solutions instead of blend-spinning the first and second spinning solutions in an electrospinning device, and combining the first and second sub-nanowebs through a needle punching process.

Comparative Example 1

A filament was manufactured by melting, spinning, and drawing conventional low-density polyethylene. A crimping process was performed on the polyethylene filament.

Subsequently, the filament was heat-set and cut into the polyethylene staples having a length of about 51 mm. A carding process and a cross-lapping process were applied to the polyethylene staples to form the webs, and then a needle-punching process was carried out on the webs to form a porous nanoweb.

Comparative Example 2

A porous nanoweb is manufactured in the same method as described in the above comparative example 1 except that polyethylene terephthalate is used instead of polyethylene.

Properties of the porous nanowebs manufactured by the above embodiments and comparative examples are measured by the following method, and are shown in the following Table 1.

Average Diameter of Filament

The average diameter of filaments constituting the porous nanoweb of the above embodiments and comparative examples was measured by the use of Scanning Electron Microscope (HITACHI S-4300) and image analyzer (using Image-Pro Plus software and JVC Digital Camera KY-F70B). In this case, after preparing five samples, diameters were measured in the prepared five samples, and then an average diameter was calculated.

Porosity (%)

The porosity in each nanoweb was obtained by calculating the rate of air volume with respect to the total volume of the nanoweb by the following formula.

$$\text{Porosity}(\%) = (\text{air volume}/\text{total volume}) \times 100$$

At this time, the total volume was calculated by measuring the width, length and thickness of the prepared sample of the rectangular-shaped nanoweb. Also, the air volume was obtained by subtracting the volume of nanofilaments from the total volume, wherein the volume of nanofilaments was calculated from the mass and density of the nanoweb sample.

Heat Shrinkage (%)

A sample having 2 cm width×5 cm length was prepared to indirectly check the form stability for each of the porous nanowebs manufactured by the above embodiments and comparative examples. Then, the prepared sample was interposed between two glass plates, fastened with a clip, and then left at 150° C. for 10 minutes. Then, after the heat treatment, the length of the sample was measured. Then, the initial length of the sample (5 cm) was divided by the length change of the sample after the heat treatment for calculating the heat shrinkage.

$$\text{Heat shrinkage}(\%) = [\text{change in the length by the heat treatment}/\text{initial length}] \times 100$$

Shutdown and Thermal Stability

For indirectly checking the shutdown and thermal stability at the high temperature in the porous nanowebs manufactured by the above embodiments and comparative examples, the sample was heated to 200° C. If the resistance inside the sample at 100° C. was 4 times or more the resistance inside the sample at 20° C., the sample was judged as having the shutdown function. When the resistance in the sample between 100° C. to 200° C. was not lowered, the sample was judged as having the thermal stability.

TABLE 1

|  | Thickness (μm) | Diameter of filament (μm) | Porosity (%) | Heat shrinkage (%) | shutdown | Thermal stability |
| --- | --- | --- | --- | --- | --- | --- |
| Embodiment 1 | 18 | 1.5 | 67 | 2.5 | ○ | ○ |
| Embodiment 2 | 20 | 3.2 | 60 | 3.0 | ○ | ○ |
| Embodiment 3 | 23 | 2.1 | 65 | 1.8 | ○ | ○ |
| Embodiment 4 | 25 | 3.0 | 70 | 5.5 | ○ | ○ |
| Comparative example 1 | 35 | 12.5 | 52 | 18.5 | ○ | X |
| Comparative example 2 | 32 | 11.3 | 55 | 8.1 | X | ○ |

What is claimed is:

1. A method for manufacturing a porous nanoweb for a separator of a secondary battery, the method comprising:
providing a first spinning solution comprising a first polymer to manufacture first nanofilaments;
providing a second spinning solution comprising a second polymer to manufacture second nanofilaments;
electrospinning the first spinning solution to form a first sub-nanoweb formed of the first nanofilaments;
electrospinning the second spinning solution to form a second sub-nanoweb formed of the second nanofilaments; and
directly combining the first and the second sub-nanowebs through a needle punching process to give the porous nanoweb comprising the first nanofilaments and the second nanofilaments,
wherein the first polymer is a polyurethane, polyethylene, polypropylene, copolymer thereof, or a mixture thereof and has a melting temperature not more than 200° C., and the second polymer is a thermoplastic polyimide or a polyimide precursor and has a melting temperature not less than 210° C., thereby preventing a short circuit of the secondary battery.

2. The method of claim 1, wherein the second polymer is the polyimide precursor, and the method further comprises imidizing the polyimide precursor after the second spinning solution is electrospinned.

3. The method of claim 1, wherein the first polymer has a melting temperature of 100-200° C., and the second polymer has a melting temperature of 210- 600° C.

4. The method of claim 1, wherein the porous nanoweb has a pore diameter ranging from 0.05 μm to 30 μm.

5. The method of claim 1, wherein the porous nanoweb has a thickness of 1-30 μm and a porosity of 40-90%.

* * * * *